(12) United States Patent
Hyde et al.

(10) Patent No.: US 6,887,551 B2
(45) Date of Patent: May 3, 2005

(54) ANCHORING SYSTEM AND SNAP-FIT METHODOLOGY FOR EROSION RESISTANT LININGS

(75) Inventors: Dean R Hyde, Southampton Hampshire (GB); Robert L. Antram, Warrenton, VA (US); John R Peterson, Ashburn, VA (US)

(73) Assignee: ExxonMobil Research & Engineering Co., Annandale, NJ (US)

( * ) Notice: Subject to any disclaimer, the term of this patent is extended or adjusted under 35 U.S.C. 154(b) by 0 days.

(21) Appl. No.: 10/439,956

(22) Filed: May 16, 2003

(65) Prior Publication Data

US 2004/0229001 A1 Nov. 18, 2004

(51) Int. Cl.$^7$ .............................. B32B 3/06; F23M 5/02
(52) U.S. Cl. ...................... 428/99; 428/100; 428/49; 428/48; 428/45; 428/53; 428/81; 428/223; 52/509; 52/510; 52/506.02; 110/336; 110/338; 110/339; 110/340
(58) Field of Search .............................. 428/45, 53, 81, 428/223, 49, 48, 99, 100; 52/509, 510, 506.02; 110/336, 338, 339, 340

(56) References Cited

U.S. PATENT DOCUMENTS

| | | | |
|---|---|---|---|
| 3,630,503 A | * | 12/1971 | Byrd, Jr. ...................... 165/9.4 |
| 4,117,201 A | | 9/1978 | Keifert |
| 4,137,681 A | | 2/1979 | Pasley |
| 4,317,418 A | * | 3/1982 | Courshon et al. ........... 110/331 |
| 4,454,181 A | * | 6/1984 | Hohn .......................... 428/68 |
| 4,523,531 A | | 6/1985 | Bishara |
| 4,753,053 A | | 6/1988 | Heard |
| 4,768,447 A | | 9/1988 | Roumeguere |
| 4,898,122 A | * | 2/1990 | Black ........................ 122/6 A |
| 5,112,223 A | * | 5/1992 | Walle et al. ................ 432/241 |
| 6,044,805 A | | 4/2000 | Walker et al. |
| 6,129,967 A | | 10/2000 | Young et al. |
| 6,740,388 B1 | * | 5/2004 | Koket ........................ 428/100 |

FOREIGN PATENT DOCUMENTS

| | | |
|---|---|---|
| EP | 66986 A | 12/1982 |
| GB | 222238 A | 2/1990 |
| GB | 2267559 A | 12/1993 |
| WO | WO 00/68615 | 11/2000 |

\* cited by examiner

*Primary Examiner*—William P. Watkins, III
(74) *Attorney, Agent, or Firm*—Jack B. Murray, Jr.; Malcolm D. Keen

(57) ABSTRACT

A tile anchoring system for use in reactors and other furnace like equipment which involves the use of a tile that contains various internal parts. According to the various embodiments of the present invention, the tile is formed as more than one part. In the present invention, various techniques and parts are used to anchor tiles to surfaces wherein the various parts and the tiles themselves "snap" into place with one another and/or with an existing hexmetal mesh structure.

22 Claims, 14 Drawing Sheets

ANCHORING SYSTEM AND SNAP-FIT METHODOLOGY FOR EROSION RESISTANT LININGS

FIELD OF THE INVENTION

The present invention relates generally to ceramic linings for walls processing vessels subject to high temperatures, corrosion and erosion, and more particularly to anchoring systems for tiles which are used to form such ceramic linings.

BACKGROUND OF THE INVENTION

Refinery process units, such as fluid catalytic cracking units, and other vessels, refinery process units, such as fluid catalytic cracking units, and other reactors and furnace-like equipment require, by their very nature, heat, wear and chemical resistant linings along portions of their interiors. The present art of ramming monolithic refractories into hexagonal-shaped metal mesh is well known.

Common practices in the field are to line reactors with hexagonal mesh (FIGS. 1–3) into which a refractory monolithic material is rammed while in a plastic, malleable state. Reactions in such materials, with or without the application of heat, cause a hardening of the material resulting in a lining in the wear areas capable of withstanding the environment encountered. In contrast to malleable state materials, it has long been known that pre-formed ceramic materials are more resistant to wear, erosion, and corrosion conditions than monolithic refractories. Ceramic tiles, though resistant to extreme conditions, are relatively brittle. As such, they must be mounted to a reactor substrate lining with care. Mounting them gently, however, often impedes how securely the tiles are affixed to the lining. Prior art has resulted in tiles that are unreliable and which fail due to thermal cycling and other stresses which occur in service.

FIGS. 1, 2 and 3 illustrate the current practice of using malleable, non-preformed materials and injecting them into mesh. Referring to these figures, it can be seen that hexagonal mesh (Hexmetal) 10, which is typically ¾ to 1" thick, is formed from metal strips 101 bent to form half-hexagonal shapes which are connected by clinches 102 punched from the metal strips 101 and bent over to secure two strips 101 together to form the hexagonal cells. Tabs 103 may be punched from metal strips 101 and help to secure the monolithic refractory into the cells after hardening. After filling of the cells, the monolithic refractory hardens by use of a setting agent or by application of heat to form a wear- and corrosion-resistance lining.

To the extent that any pre-formed tiles are used, tabs 103 may be of assistance in securing the tiles. The punching of tabs 103 leaves holes 104 in metal strips 101. These holes 104 can be used to secure pre-formed tiles to the interior of a reactor surface in place of the monolithic material.

Unfortunately, state of the art linings and the related techniques suffer from a number of drawbacks. These drawbacks include a relatively low mechanical stability and they often require very thick and heavy walls in order to provide the properties necessary to protect the reactor components. Another disadvantage of these prior art linings is the fact that it is generally difficult to remove individual elements or lining sections easily or non-destructively for replacement.

Finally, these prior art linings often are incapable of satisfying the ceramic property requirements associated with increasingly severe processes that result in ever increasing thermal and mechanical loads and stressing.

SUMMARY OF THE INVENTION

What is needed is an anchoring system that will securely hold tiles to substrate surfaces, while at the same time being easy to install and preferably being able to be retrofitted onto existing reactor linings, including those using existing mesh structures to secure the lining materials. According to a representative embodiment, the present invention comprises a solution in which a tile is produced with several internal parts. Depending upon the particular embodiment, these parts may be added either during the manufacture of the tile or thereafter.

One object of the present invention is to provide a tile for use in refinery process units, reactors and other furnace-like equipment and a way to permit the tile to be easily affixed to a substrate.

Another object is to provide a tile for use in refinery process units, reactors and other furnace-like equipment that is capable of remaining affixed to a substrate despite being exposed to a severe environment.

These and other objects will become apparent from the detailed description of the preferred forms set out below and now summarized as follows. The present invention employs individual tiles to form the reactor lining and to provide the ceramic properties that are required by a broad range of processes. The tiles forming the ceramic lining of the present invention are mounted into a hexagonal mesh or other abutment. Preformed tiles according to the teachings of the present invention have an advantage over the present in-situ-formed monolithic linings in that they can be made much more durable than present linings, as well as being more easily replaced, in whole or in part, over a continuous lining.

Further, problems arising in the mounting of tiles to form an internal refractory surface are addressed according to the present invention. Unreliable mounting systems in the prior art which allow ingress of particulate materials (catalyst or other) between or beneath tiles, lead to quicker degradation of the refractory lining, resulting in poor performance, downtime or property damage. Typically, in a room-temperature application, tiles are cemented or anchored via simple mechanical attachment to a substrate. Where elevated temperatures are involved, the ceramic tiles become loose or form gaps between them due to reversible thermal expansion differences between the tiles and the metal substrate. Typically, ceramics have half or less reversible thermal expansion as compared to stainless steels. If particulate materials are present and are of sufficiently small size, as is the case with FCCU's, they may become lodged between and behind the tiles. When the unit subsequently cools for any reason, reversible thermal expansion dictates that the tile return to the original size. The trapped particulate material prevents this from happening, setting up powerful stresses in the tile, often causing failure of the tile itself or failure of the attachment.

The present invention allows for tiles to be placed into the same hexagonal arrangement of mesh now commonly used in cyclones, and at the same time prevents the deleterious effects of particulate ingress.

A preferred form of the tile for use in refinery process units, reactors and other furnace-like equipment is intended to accomplish at least one or more of the aforementioned objects. One such form includes a tile for use in reactors and other furnace like equipment wherein the tile is employed in connection with an anchoring system that involves the use of internal parts. The tile with the associated internal parts is then placed on the parent material surface such that it is held in place and stays firmly affixed to the substrate surface.

According to the present invention, the tiles for lining the surface of a substrate material, are in two parts, a top part and a bottom part with the top part having the wear resistant face. The top part and the bottom part are selectively engagable with one another by means of at least one protrusion which is located on one of the two parts and which is selectively engagable with at least one receptacle located on the other of the two parts. The protrusion comprises (i) a neck portion (ii) a laterally extensive enlarged portion and (iii) a latching surface; the receptacle comprises (i) a throat portion capable of receiving the enlarged portion of the protrusion, (ii) an enlarged cavity portion capable of receiving the enlarged portion of the protrusion and (iii) a latching surface engagable with the latching surface of the protrusion to hold the top tile portion and the bottom tile portion in engagement.

In a first exemplary embodiment of the present invention, two separate tile parts are used to form a single tile of the overall protective tile lining. The first tile part is applied directly to the substrate and is retained in place by welding it thereto. A second tile part is then applied over the first tile part and the second part "snap-fits" to attach to the first tile part as a result of two male protrusions rising up from the first tile part and "snapping" into associated female receptor cutouts in the second tile part. This embodiment is particularly useful for replacing prior art monolithic material in existing hexagonal metal cells.

In a second exemplary embodiment of the present invention, the two-piece tile assembly has protrusion on two faces and recesses on two faces. These allow tiles to be interlocked with adjacent tiles. This embodiment may be utilized in areas not containing an existing hexmetal structure to give additional locking security. In the event that hexmetal is present, single tile material parts include recesses which adapt to allow the existing hexmetal mesh tabs to be locked into place and to secure the tile material parts to the parent material surface.

As will be recognized by one of skill in the art, and as will be explained in further detail below, the present invention provides many advantages including the secure fastening of ceramic tiles to the substrate surface while also allowing easy and convenient retrofitting particularly in cases where a hexagonal mesh material is already in place.

BRIEF DESCRIPTION OF THE DRAWINGS

The present invention will now be described in more detail with reference to preferred forms of the invention, given only by way of example, and with reference to the accompanying drawings, in which.

DETAILED DESCRIPTION OF THE INVENTION

Reference is now made to the forms depicted in FIGS. 1 through 5 wherein like numerals refer to like elements.

Surfaces that are subject to high levels of erosion, wear, corrosive elements, high temperatures and other such conditions need to be protected with materials that are resistant to such an environment. Refinery process units, such as fluid catalytic cracking units, furnaces and other types of equipment, hereinafter referred to generically as "process vessels," generally have a need for such linings. Although there are other kinds of equipment that equally have a need for such resistant linings, process vessels herein are used an exemplary embodiment of such equipment although the invention described herein is not necessarily limited thereto.

A more reliable method of mounting tiles to a reactor lining using a novel "snap-fitting" technique is now described. The method includes various embodiments which are further described herein in connection with the attached figures.

Figure 1:
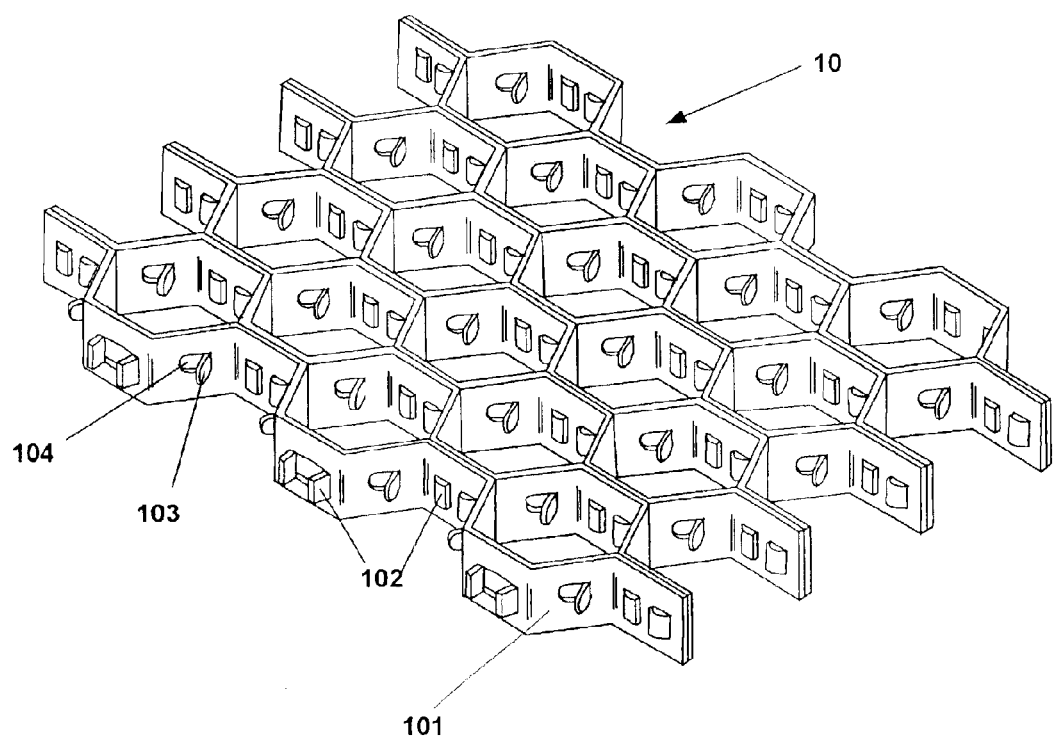
FIG. 1 illustrates a typical hexagon metal mesh covering utilized in the prior art to contain monolithic materials in the hexagonal cells.
Figure 2:
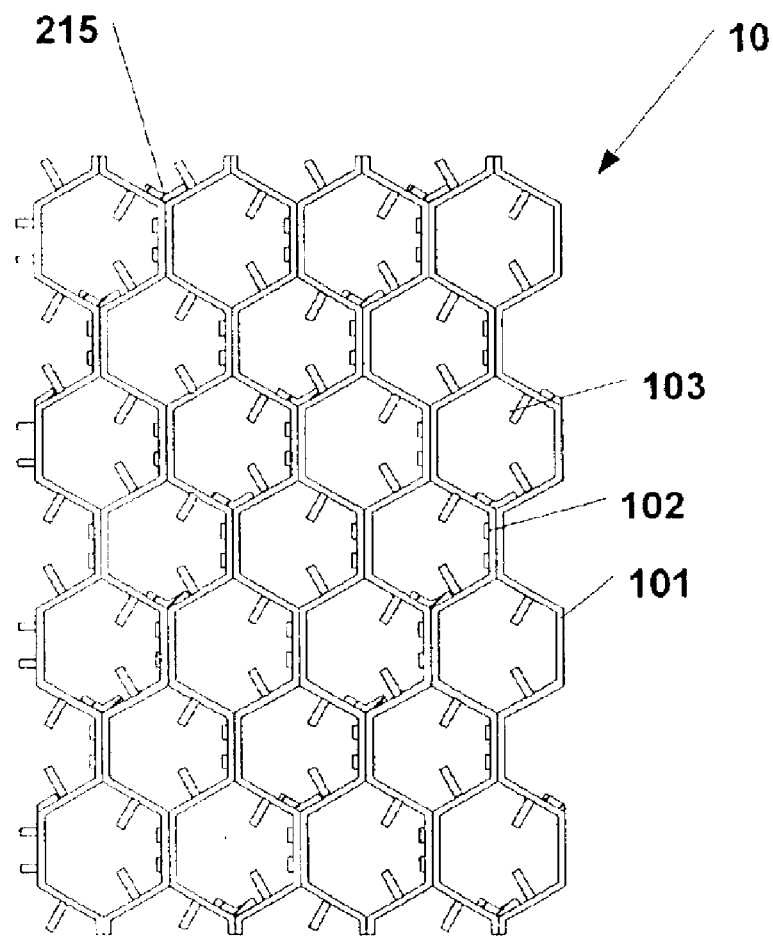
FIG. 2 is a plan view of the hexmetal mesh as used in the prior art to secure monolithic materials to the substrate material.
Figure 3:
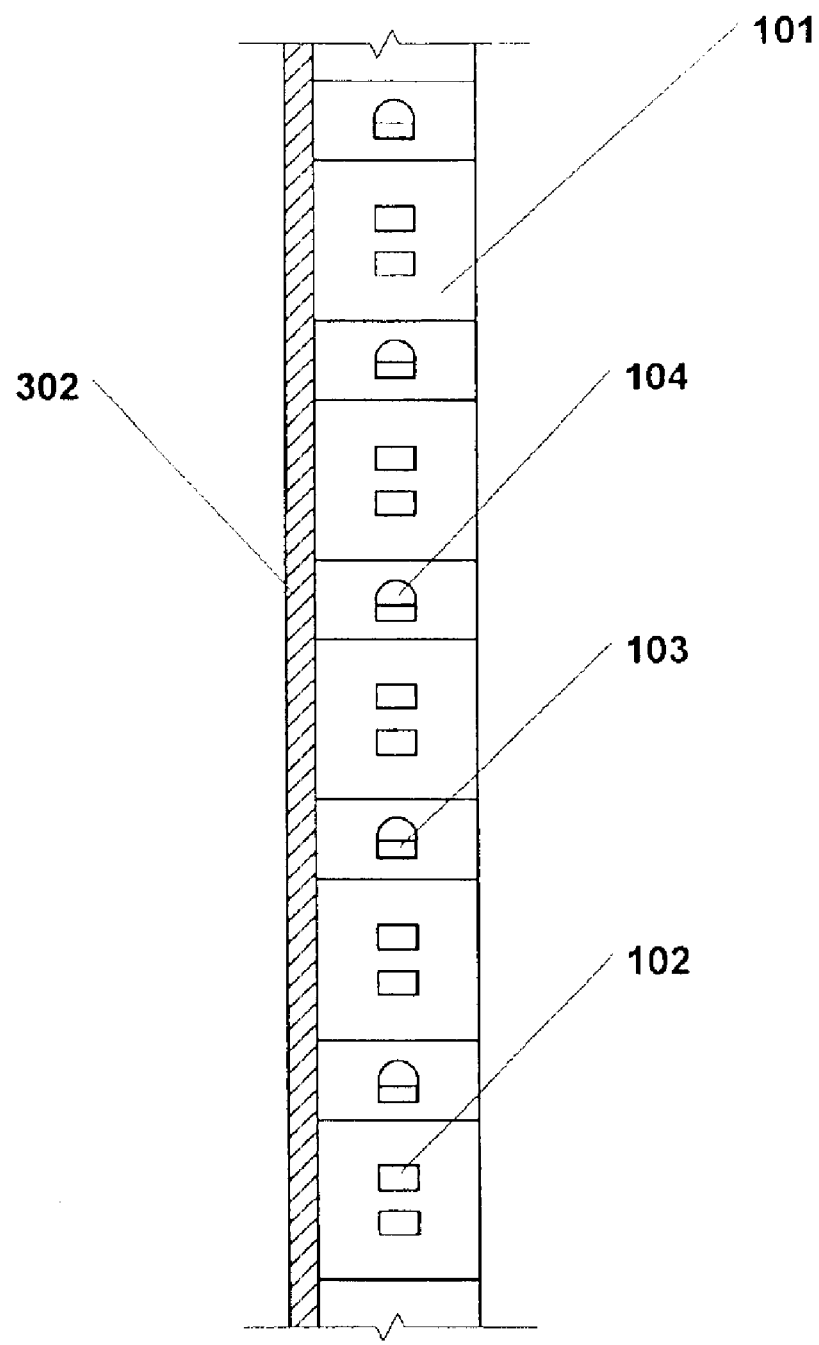
FIG. 3 is a side view showing hexmetal mesh against substrate material as formed in connection with prior art attachment methodologies.
Figure 4A:
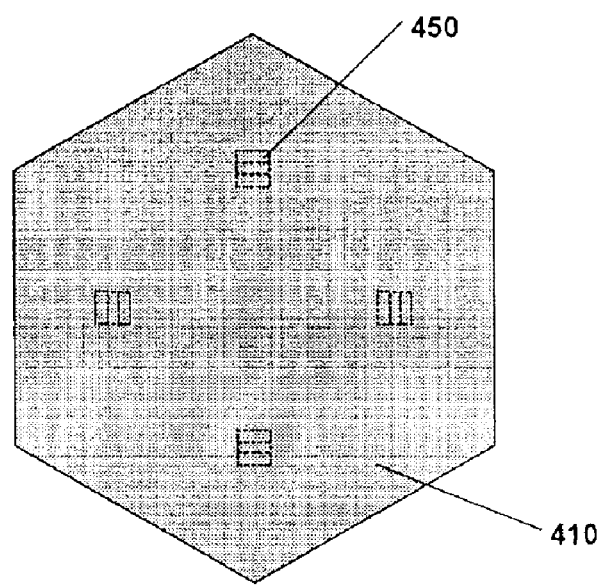
FIG. 4A is a plan view of the top tile part in connection with a first embodiment of the present invention.
Figure 4B:
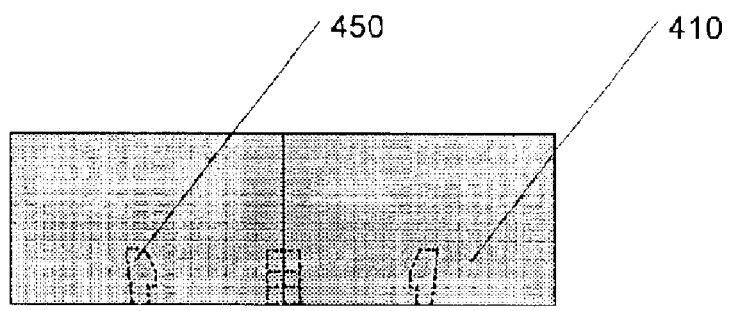
FIG. 4B is a side view of the top tile part in connection with a first embodiment of the present invention.
Figure 4C:
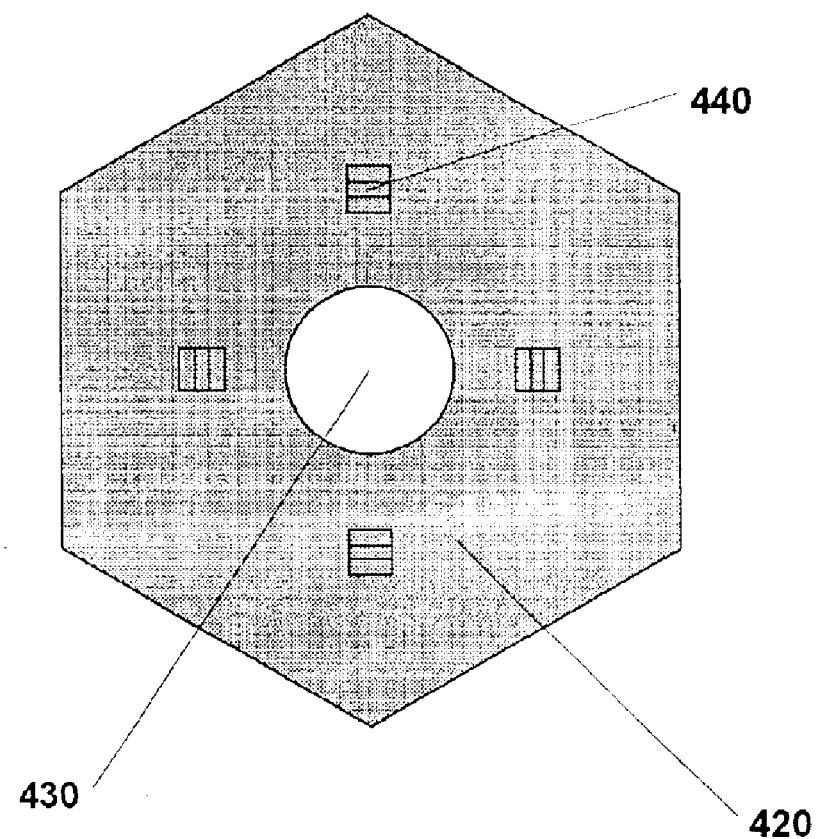
FIG. 4C is a plan view of the bottom tile part in connection with a first embodiment of the present invention.
Figure 4D:
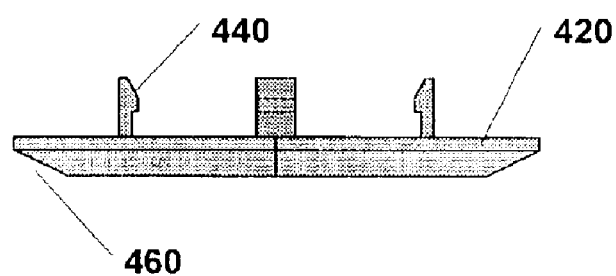
FIG. 4D is a side view of the bottom tile part in connection with a first embodiment of the present invention.
Figure 4E:
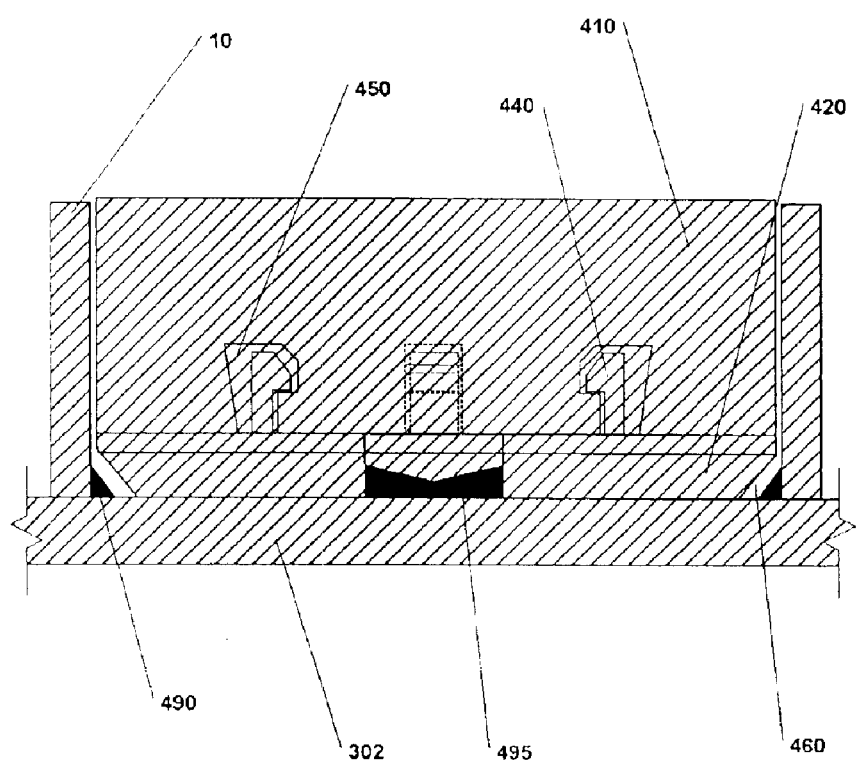
FIG. 4E is a sectional view showing the bottom tile part welded in place within a hexmetal structure and the top tile part snapped into place according to the first embodiment of the present invention.

In a first embodiment and as shown in FIGS. 4A–4E, the tile system is composed of two component parts, a top tile part 410 and a bottom tile part 420. Detail for top tile part 410 is shown in FIGS. 4A and 4B which represent a plan view and a side view, respectively, of top tile part 410. Detail for bottom tile part 420 is shown in FIGS. 4C and 4D which represent a plan view and a side view, respectively, of bottom tile part 420. FIG. 4E illustrates the collective assembly of top tile part 410 and bottom tile part 420 as secured to the substrate 302.

According to the teachings of the present invention, bottom tile part 420 is preferably made of the same material as the substrate material 302 and is fabricated to include four "snap-fit" locking tabs 440 extending upward from the top face of bottom tile part 420. This is best seen in FIG. 4D. Locking tabs 440 are flexible to a degree such that when top tile part 410, which includes corresponding locking recesses 450 designed to accept locking tabs 440, is forced down onto bottom tile part 420, the two tile parts 410 and 420 will snap into place and mechanically connect with each other. Bottom tile part 420 contains center plug weld orifice 430 which is used to apply a plug weld 495 to weld the bottom tile part 420 to the substrate 302 as described below. Top tile part 410 is formed from heat and wear resistant material as described above.

One of skill in the art will recognize that the present invention is not limited to four locking tabs 440 and that more or less such tabs and corresponding recesses may be employed in connection with the teachings of the present invention. It will also be noted that the bottom tile part 420 in the first embodiment now described preferably includes a chamfer 460 to provide room for welds 490 which attach hexmetal mesh walls 10, or some other abutment, to the substrate 302.

It is also possible to use a triangular part tile in order to form a straight edge at a lining boundary.

According to the first embodiment of the present invention, the process for installing ceramic tiles on the substrate surface 302 is as follows. First, the existing refractory residing in the hexmetal mesh 10, if present on the reactor surface, is removed. Next, in this embodiment, the retaining tabs 103 used in connection with the refractory application should be removed. Following that, bottom tile part 420 should be inserted into a cell of hexmetal mesh 10 and placed so the bottom face of bottom tile part 420 is in direct contact with the substrate surface 302.

Next, the bottom tile part 420 is welded to the substrate material 302 through center plug weld orifice 430. Bottom tile part 420 has chamfered edges 460 to accommodate the existing welds 490 of hexmetal mesh 10 to substrate material 302. Then, the top tile part 410 is placed within a cell of hexmetal mesh 10 and on top of bottom tile part 420 ensuring that the locking tabs 440 locate within the corresponding locking recesses 450 within top tile part 410. In the next step, a force is applied on the wear face of top tile part 410 until the locking tabs 440 snap into place and an audible click is heard indicating that a connection has been achieved. The process is then repeated for each tile until the application area is covered as desired.

In a second embodiment of the present invention, which is described in connection with FIGS. 5A–5F, the first embodiment is refined to enable secure attachment of the tile with the existing hexmetal structure removed. This embodiment is also useful where no existing hexmetal is originally present. Although a hexagonal shape is shown, any shape capable of covering an area, such as rectangles or triangles, may be utilized. In this embodiment, lower tile part 520 may be similar to lower tile part 420 of the first embodiment, having locking tabs 540 a center plug weld orifice 530 and chamfered edges 560. The upper tile part 510 may also be similar to upper tile part 410 in the first embodiment, but with locking recesses 550 to accept the locking tabs 540 from the lower tile part 520, and the addition of male protrusions 565 and female receptacles 570 to enable locking of adjacent tiles.

According to the second embodiment of the present invention, the process for installing ceramic tiles on the surface of substrate is as follows. First, existing refractory and hexmetal mesh on the substrate 302, if any, should be removed. Following that, lower tile part 520 should be welded to the substrate 302 using plug weld 595 which is provided through the center plug welding orifice 530 to substrate 302. Welding can be limited to the plug area provided 530 or can extend along one or more chamfered edges 560 if desired.

Next, the upper tile part 510 is placed over lower tile part 520 with locking recesses 550 centered over the locking tabs 540 or the lower tile part 520. Next, a force is applied on the wear face (upper portion) of upper tile part 510 until it engages with lower tile part 520. In connection with the placement of tiles, male protrusions 565 should be aligned with and interlocked with female receptacles 570 to provide additional stability. The process is then repeated for each tile until the application area is covered as desired.

Figure 5A:
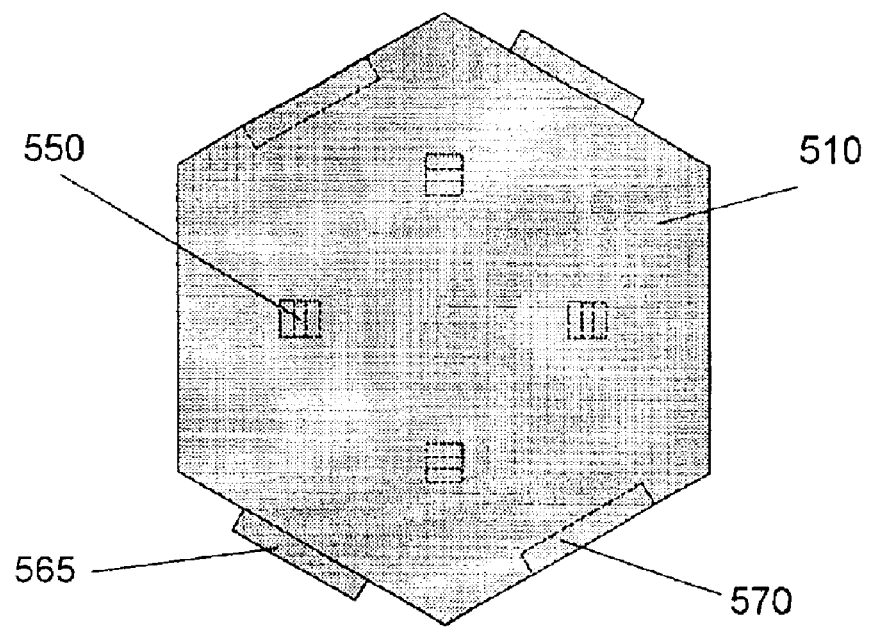
FIG. 5A is a plan view of the top tile part in connection with a second embodiment of the present invention.
Figure 5B:
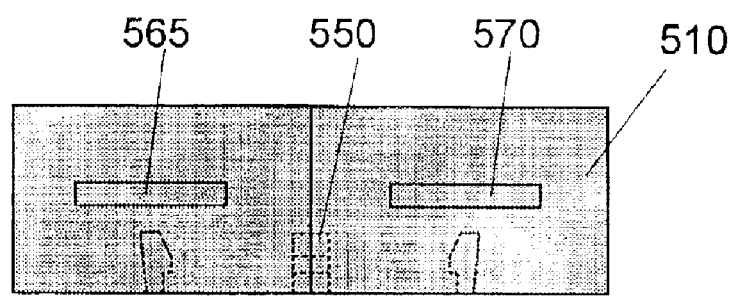
FIG. 5B is a side view of the top tile part in connection with a second embodiment of the present invention.
Figure 5C:
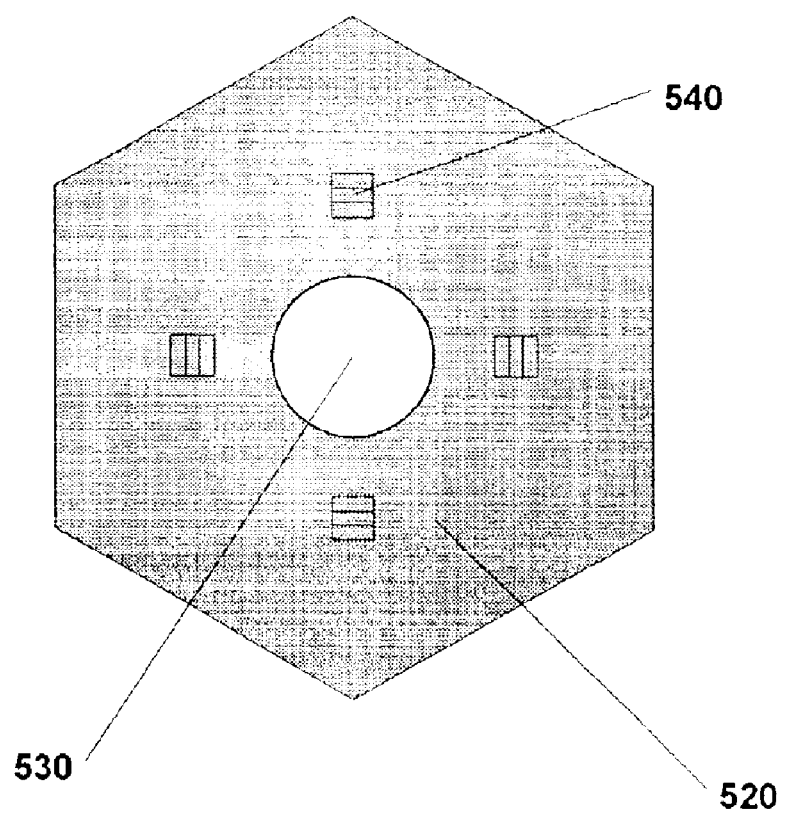
FIG. 5C is a plan view of the bottom tile part in connection with a second embodiment of the present invention.
Figure 5D:
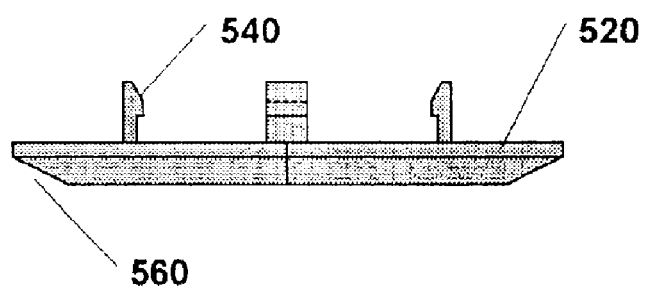
FIG. 5D is a side view of the bottom tile part in connection with a second embodiment of the present invention.
Figure 5E:
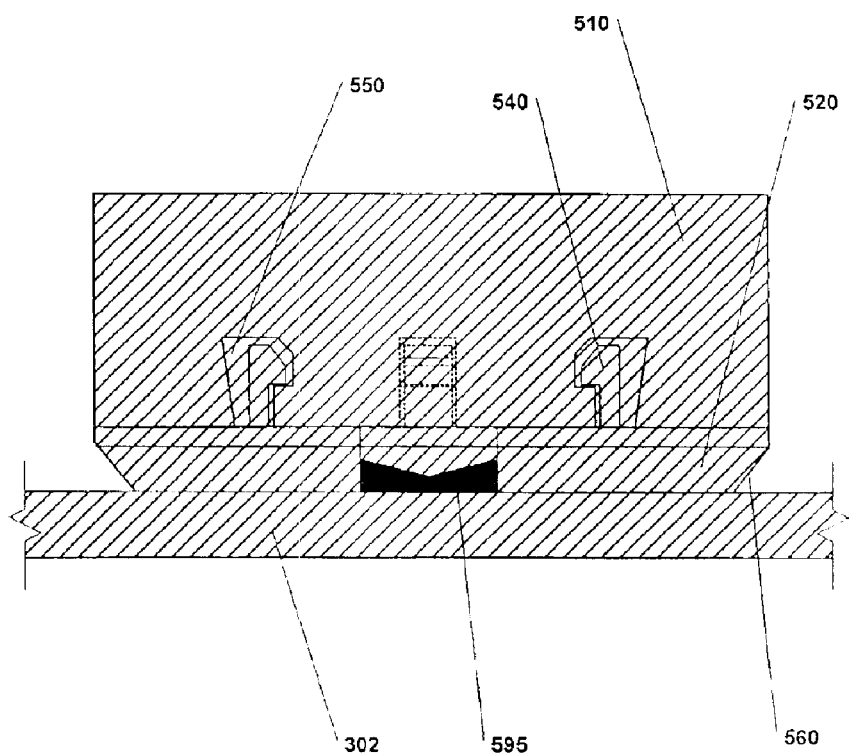
FIG. 5E is a sectional view showing the bottom tile part welded to the substrate and the top tile part snapped into place according to the second embodiment of the present invention.
Figure 5F:
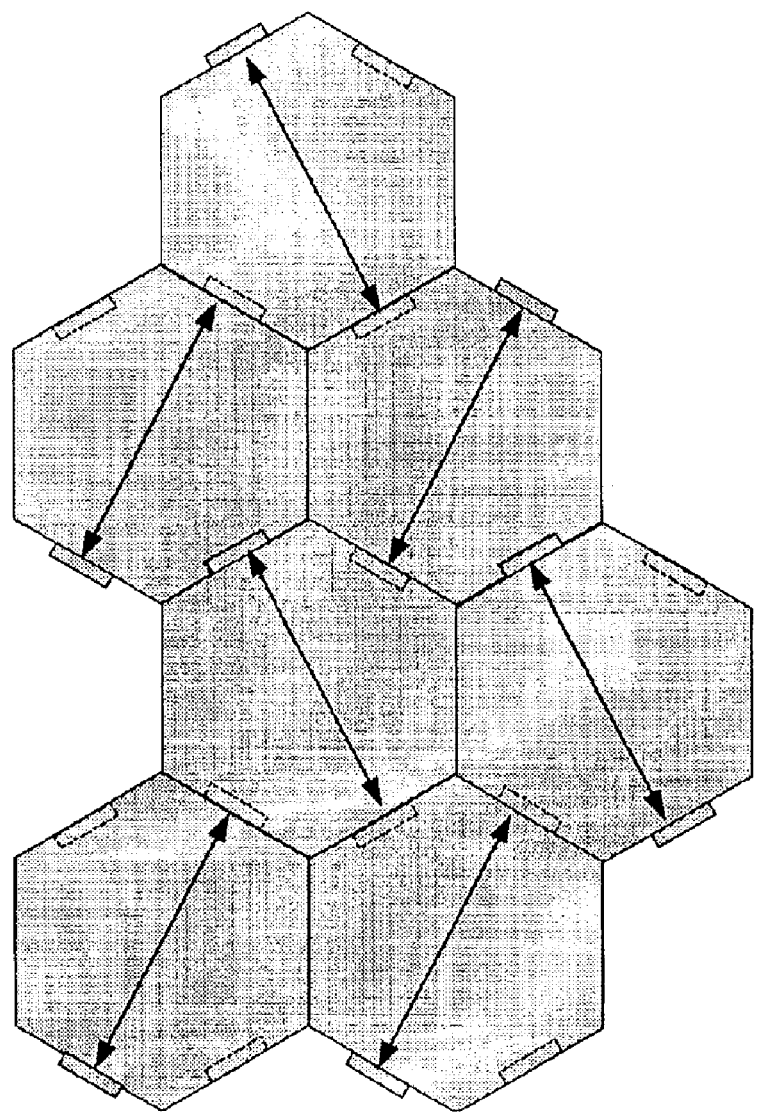
FIG. 5F is a schematic illustration showing the preferred orientation for tiles according to a second embodiment of the present invention.

FIG. 5F shows the preferred orientation of tiles according to the second embodiment. Arrows indicate the orientation of male protrusions 565.

Due to the relatively small size of the tiles in the embodiments of the present invention, the resulting lining will fit to a wide range of curved to flat surfaces, while providing for a secure anchoring with or without hexmetal or other abutment. The small size and joints between tiles, although very small, provide for application of sufficient thermal expansion allowance so as to afford a tight fit at expected operating temperatures.

Tiles may be manufactured from a variety of materials including ceramic or metal matrix compositions and using the sintering of Hot Isostatic Processing (HIP) techniques. Manufacture in this manner permits the tiles to offer possible levels of erosion and chemical resistance that is unobtainable with prior art monolithic lining materials.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

What is claimed is:

1. A system for lining a surface of a substrate material, comprising:

at least one tile having a refractory wear resistant face;

said at least one tile comprising a top tile part and a bottom tile part;

wherein said top tile part comprises the wear resistant face and said top tile part and said bottom tile part are selectively engaged with one another by means of at least one protrusion located on one of the top tile part and the bottom tile part and which is selectively engagable with at least one receptacle located on the other of the top tile part and the bottom tile part, the protrusion comprising (i) a neck portion (ii) a laterally extensive enlarged portion and (iii) a latching surface, the receptacle comprising (i) a throat portion capable of receiving the enlarged portion of the protrusion, (ii) an enlarged cavity portion capable of receiving the enlarged portion of the protrusion and (iii) a latching surface engagable with the latching surface or the protrusion to hold the top tile portion and the bottom tile portion in engagement.

2. The system according to claim 1 wherein said top tile part comprises at least one protrusion and said bottom tile part comprises at least one receptacle.

3. The system according to claim 1 wherein said bottom tile part comprises at least one protrusion and said top tile part comprises at least one receptacle.

4. The system according to claim 2 wherein said top tile part comprises tour protrusions.

5. The system according to claim 3 wherein said bottom tile part comprises four protrusions.

6. The system according to claim 1, which includes an upstanding mesh structure on the surface of the substrate material wherein said bottom tile part and said top tile part are located within a the mesh structure.

7. The system according to claim 6, wherein said upstanding mesh structure is hexagonal mesh welded to said substrate material.

8. The system according to claim 1 wherein said bottom tile part is welded to said substrate material in at least one location.

9. The system according to claim 1 comprising a plurality of laterally adjacent tiles lining the surface of the substrate material wherein each tile further comprises at least one lateral protrusion for mating with a receptacle in an a laterally adjacent tile.

10. The system according to claim 1 comprising a plurality of laterally adjacent tiles lining the surface of the substrate material wherein each tile further comprises at least one receptacle for mating with a lateral protrusion in a laterally adjacent tile.

11. A tile for lining a surface of a substrate material comprising:

a top tile part having a refractory wear-resistant face;

a bottom tile part;

wherein said top tile part and said bottom tile part are selectively engagable with one another by means of at least one protrusion located on one of the top tile part and the bottom tile part and which is selectively engagable with at least one receptacle located on the other of the top tile part and the bottom tile part, the protrusion comprising (i) a neck portion (ii) a laterally extensive enlarged portion and (iii) a latching surface, the receptacle comprising (i) a throat portion capable of receiving the enlarged portion of the protrusion, (ii) an enlarged cavity portion capable of receiving the enlarged portion of the protrusion and (iii) a latching surface engagable with the latching surface of the protrusion to hold the top tile portion and the bottom file portion in engagement.

12. The tile according to claim 11 wherein said top tile part comprises at least one protrusion and said bottom tile part comprises at least one receptacle.

13. The tile according to claim 11 wherein said bottom tile part comprises at least one protrusion and said top tile part comprises at least one receptacle.

14. The tile according to claim 12 wherein said top tile part comprises four protrusions.

15. The tile according to claim 13 wherein said bottom tile part comprises four protrusions.

16. The tile according to claim 11 wherein said bottom tile part further comprises at least one chamfered edge to provide at least one welding point.

17. The tile according to claim 11 further comprising at least one laterally extensive protrusion for mating with a receptacle in a laterally adjacent tile.

18. The tile according to claim 11 further comprising at least one laterally extensive receptacle for mating with a protrusion in a laterally adjacent tile.

19. The tile according to claim 11 further comprising at least one laterally extensive receptacle and one laterally extensive protrusion for mating with a laterally extensive receptacle or a laterally extensive protrusion in a laterally adjacent tile.

20. The system according to claim 1 comprising a plurality of laterally adjacent tiles lining the surface of tile substrate material wherein each tile comprises two laterally extensive opposed receptacles for mating with lateral protrusions of laterally adjacent tiles.

21. The system according to claim 20 comprising a plurality of laterally adjacent hexagonal tiles lining the surface of the substrate material wherein each hexagonal tile comprises two laterally extensive opposed receptacles for mating with lateral protrusions of laterally adjacent hexagonal tiles.

22. The tile according to claim 11 which comprises two laterally extensive opposed receptacles and two laterally extensive opposed protrusions for mating with laterally adjacent tiles.

* * * * *